W. M. METZLER.
CONVEYER BELT.
APPLICATION FILED NOV. 22, 1909.
975,560.
Patented Nov. 15, 1910.
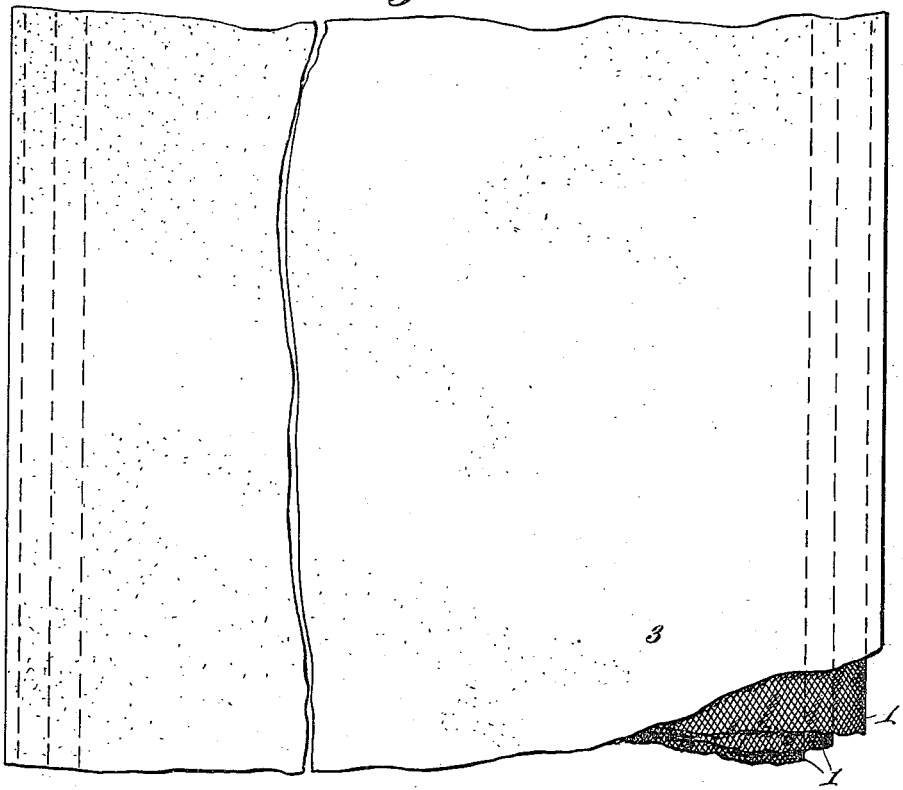
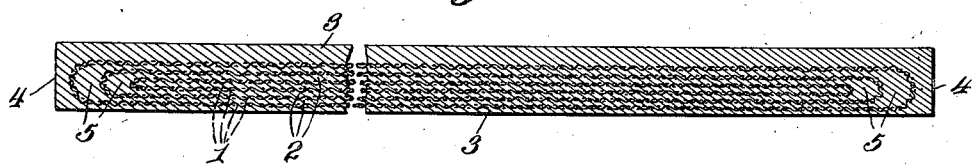

UNITED STATES PATENT OFFICE.

WILLIAM M. METZLER, OF AKRON, OHIO.

CONVEYER-BELT.

975,560.  Specification of Letters Patent.  Patented Nov. 15, 1910.

Application filed November 22, 1909. Serial No. 529,329.

*To all whom it may concern:*

Be it known that I, WILLIAM M. METZLER, a citizen of the United States, residing at Akron, in the county of Summit and State of Ohio, have invented new and useful Improvements in Conveyer-Belts, of which the following is a specification.

This invention relates to improvements in conveyer belts, and has particular reference to that class of belts formed of rubber and layers of fabric, and the object is to so construct a belt of this character as to prevent the ingress of sand or grit between the rubber and fabric at the longitudinal edges of the belt as the latter wears, thereby preventing the gradual separation of the layers of fabric from the rubber.

With the above object in view the invention consists in the novel features of construction hereinafter fully described, particularly pointed out in the claims, and clearly illustrated by the accompanying drawing, in which—

Figure 1 is a top plan view of a portion of a belt constructed in accordance with my invention, and Fig. 2, a transverse sectional view.

In the ordinary type of belt built up of rubber and layers of fabric the longitudinal edges soon wear with the result that grit and dirt enter between the fabric and rubber and separate them, so that, for a considerable distance from the edges, the layers of fabric hang perfectly loose. My invention is designed to obviate this by providing at the edges of the belt and also between the edge-folds of the fabric, strips or cushions of rubber, which prevent ingress of sand or grit.

The belt illustrated consists of layers 1 of fabric formed by folded sheets of fabric placed one within the other with the folds disposed at the longitudinal edges of the belt. These layers of fabric are united by rubber which forms thin layers 2 therebetween, and the flat surfaces 3 of the belt are also of rubber. In forming my improved belt I provide at each longitudinal edge thereof, a rubber strip of protecting-portion 4 formed integral with the two flat rubber surfaces 3, these protecting-portions 4 being disposed at the edges of the outermost doubled or folded fabric. Disposed between each end-fold of each folded fabric except the innermost one is a rubber strip or protecting portion 5, extending throughout the longitudinal extent of the belt. From the above description, it will be seen that as each fold of fabric wears through, there is exposed a protecting-portion of rubber which prevents ingress of sand or grit between the layers of fabric.

Having thus fully described my invention what I claim as new and desire to secure by Letters Patent of the United States, is:—

1. A belt composed of rubber and layers of fabric formed by doubling or folding the fabric at the longitudinal edges of the belt, the folds at the edges of the belt being widely separated relatively to the layers proper, a cementing medium for uniting the layers, and rubber on the faces, and edges of the belt and in the spaces between said edge-folds to provide protecting-portions of considerable extent for the fabric-layers at the edges of the belt.

2. A belt composed of fabric arranged in folds lying one within the other forming a plurality of flat parallel layers extending longitudinally of the belt, the connecting-portions of the layers at the longitudinal edges of the belt being widely separated relatively to the flat portions of said layers, a cementing medium for uniting the flat portions of the layers, a covering of rubber on the faces and edges of the belt, and protecting-portions of rubber in the spaces between the connecting-portions of the several layers, the spaces formed by separating said connecting-portions being of such extent as to provide rubber protecting-portions of considerable thickness for each layer of fabric at each longitudinal edge of the belt.

In testimony whereof I, affix my, signature in the presence of two witnesses.

WILLIAM M. METZLER.

Witnesses:
O. S. HART,
D. GALIHOUSE.